(12) United States Patent
Wernecke

(10) Patent No.: US 8,434,017 B2
(45) Date of Patent: Apr. 30, 2013

(54) COMPUTER USER INTERFACE HAVING SELECTABLE HISTORICAL AND DEFAULT VALUES

(75) Inventor: Gregg Wernecke, La Crescent, MN (US)

(73) Assignee: Business Objects Software Limited, Dublin (IE)

( * ) Notice: Subject to any disclaimer, the term of this patent is extended or adjusted under 35 U.S.C. 154(b) by 189 days.

(21) Appl. No.: 13/052,697

(22) Filed: Mar. 21, 2011

(65) Prior Publication Data

US 2012/0246589 A1    Sep. 27, 2012

(51) Int. Cl.
*G06F 3/048* (2006.01)

(52) U.S. Cl.
USPC ............ 715/780; 715/809; 715/817; 715/771

(58) Field of Classification Search .................. 715/771, 715/809, 781, 817, 780
See application file for complete search history.

(56) References Cited

U.S. PATENT DOCUMENTS

| | | | |
|---|---|---|---|
| 5,666,502 A | 9/1997 | Capps | |
| 5,877,766 A * | 3/1999 | Bates et al. | 715/854 |
| 6,820,111 B1 | 11/2004 | Rubin et al. | |
| 7,194,695 B1 * | 3/2007 | Racine et al. | 715/780 |
| 2002/0070980 A1 * | 6/2002 | Le et al. | 345/828 |
| 2005/0160353 A1 * | 7/2005 | Conrad et al. | 715/505 |
| 2006/0041846 A1 * | 2/2006 | Masselle et al. | 715/793 |
| 2006/0048074 A1 * | 3/2006 | Klein | 715/811 |
| 2008/0010586 A1 * | 1/2008 | Betancourt et al. | 715/221 |
| 2008/0126787 A1 * | 5/2008 | Childress et al. | 713/100 |
| 2010/0174974 A1 * | 7/2010 | Brisebois et al. | 715/223 |

* cited by examiner

*Primary Examiner* — Daeho Song
(74) *Attorney, Agent, or Firm* — Fountainhead Law Group PC

(57) ABSTRACT

Providing input data in a user interface includes presenting previous data states of the user interface. One or more selections of input controls from previous data states of the user interface can be received. Data associated to those selections of input controls can be associated with corresponding input controls in a current session dialog of the user interface.

20 Claims, 10 Drawing Sheets

COMPUTER USER INTERFACE HAVING SELECTABLE HISTORICAL AND DEFAULT VALUES

BACKGROUND

The present invention relates to user interfaces and in particular to a user interface having selectable historical and/or default values.

Unless otherwise indicated herein, the approaches described in this section are not prior art to the claims in this application and are not admitted to be prior art by inclusion in this section.

Computer user interface (UI) users continually fill out UI dialogs, which typically comprise various kinds of data input fields. Such data input fields may be represented by images such as alphanumeric input boxes, checkboxes, radio buttons, dropdown menus, sliders, and so on. A common problem and deterrent to user productivity is having to re-enter the same information that was previously entered in earlier sessions of use. It can be tedious having to re-enter information from previous sessions. The same can be true for implementing default user values or default initial values such as "factory settings" for a specific set of controls of an application's user interface.

Some typical operational scenarios of repetitive activities include: Setting up new jobs or informational forms in an application may require the user to frequently choose values from one or more previous sessions, or user default values, or initial default (e.g., factory settings) values. Maintaining existing jobs or informational forms of an application may require the user to recall seeing and setting specific controls to values that have been chosen in previous sessions. Changing existing jobs or informational forms may require the user to set an entire section of values to user defaults or initial default (factory settings) values, or to values from one or more previous sessions. Changing input values in a current dialog or UI form may require inputting a mixture of values from a variety of previous sessions, user default values, or initial default values.

These and other problems are addressed by embodiments of the invention, individually and collectively.

SUMMARY

Embodiments of the present invention improve interactions with a user interface to provide input data to input fields in the user interface. In one embodiment the present invention includes displaying representations of a current session dialog and previous session dialogs of a user interface, including the input controls comprising the session dialogs. User input indicative of a selected input control in a previous session dialog can be received. Data associated with the selected input control can be associated with the corresponding input control in the current session dialog. The display of the input control in the current session dialog can be updated to reflect the associated value. In an embodiment, all input controls from the previous session dialog that received user input can be selected and brought forward into the current session dialog.

In embodiments, the representation of each session dialog can be displayed in its own window.

In embodiments, the representations of the session dialogs can be displayed sequentially in one window.

In embodiments, one of the session dialogs comprise default values. In an embodiment, default values may include factory settings. In an embodiment, default values may include user defined default values.

The following detailed description and accompanying drawings provide a better understanding of the nature and advantages of the present invention.

DETAILED DESCRIPTION

Described herein are techniques for a user interface having selectable historical and default data. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
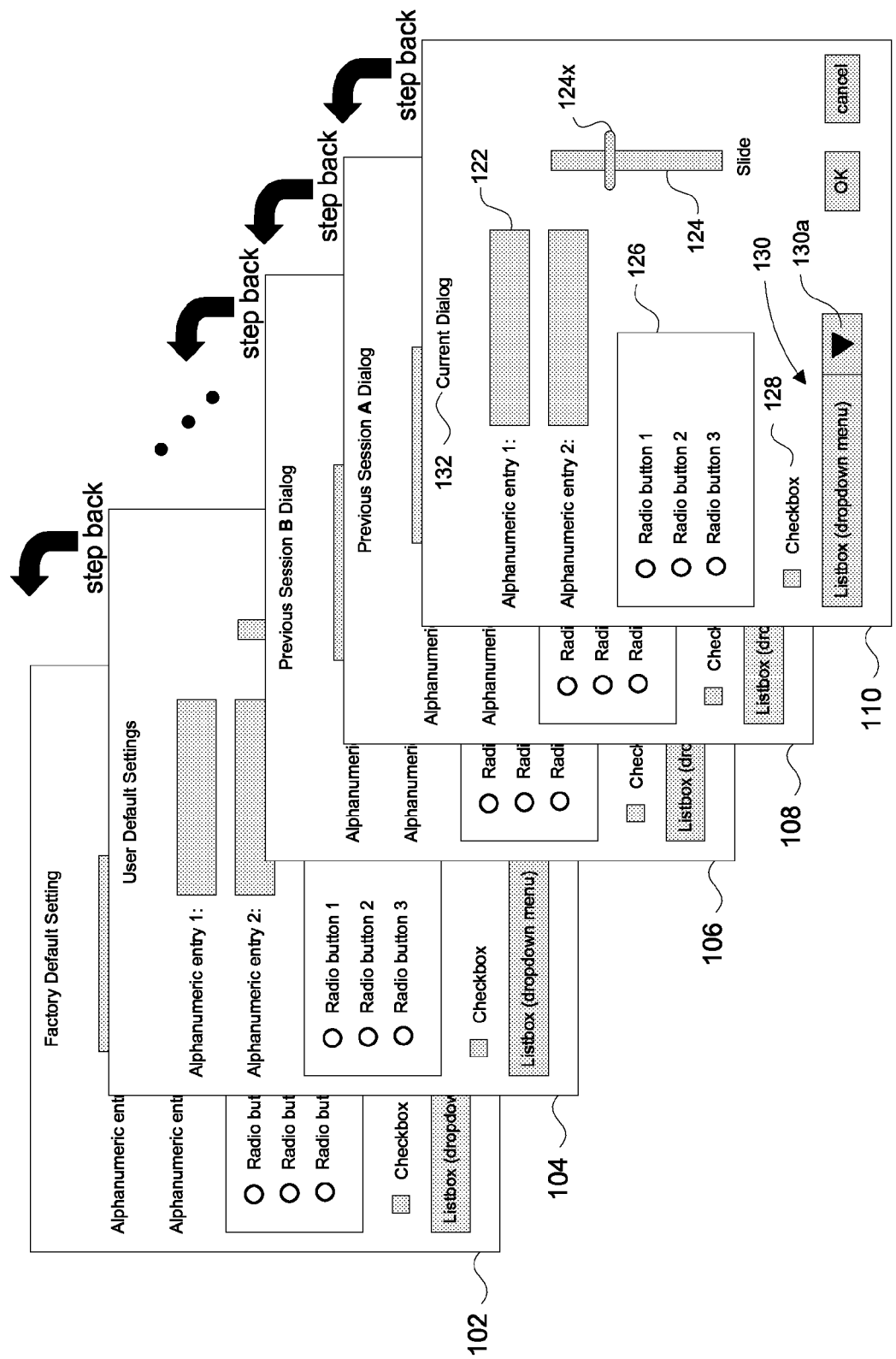
FIG. 1 illustrates a sequence of user interface dialogs in accordance with embodiments of the present invention.

As illustrated in FIG. 1, embodiments in accordance with the present invention maintain, historical information for session dialogs with a user interface. A dialog is an interactive session with the user interface including the inputting of values into data fields into the user interface and providing visual or auditory feedback to the user (e.g., displaying the input data, sounding a beep to indicate an invalid value, and so on). In addition, factory default settings and user-specified default settings for the user interface may be maintained. A session dialog with a user interface refers to the inputting of data (typically by a user) to provide data for data input fields in a user interface. A snapshot of the data that has been input at any given moment can be referred to as the "data state" for the data input fields in the user interface.

FIG. 1 shows an illustrative collection of user interface sessions. For example, a first session 102 may simply comprise default settings for one or more of the data input fields in the user interface that may be programmed into the software for the user interface. Another session 104 may comprise default values previously defined by a user for one or more of the data input fields in the user interface. Sessions 106 and 108 similarly represent previous data states of data input fields in the user interface at previous points in time. In comparison, session 110 represents a current data state of the data input fields in the user interface. In embodiments, the current session dialog may be a display of the user interface that the user is currently interacting with.

In accordance with the present invention, the user can "step back" to previous sessions of dialogs with the user interface to review previously entered data and to select previously entered data for entry into the current session dialog. Each session can be displayed in its own window, as illustrated in FIG. 1 for example.

The user interface representing a session comprises various graphical and textual elements. Consider the representation of the current session dialog 110 in FIG. 1. Each representation of a session may include a session title 132. For example, the current session dialog can be titled "Current Dialog". Previous session dialogs may be similarly titled in order to facilitate the user in identifying and locating a particular session. In embodiments, previous session dialogs can be in different ways; for example by the use of different colors, different borders, and the like.

The representation of a session includes a representation of an input data field. More generally, any user interface element that a user can interact with is known as a "control"; other terms such as "widget" are also used. The interaction may represent input data. The user interface representation 110 shown in FIG. 1 includes some common controls. For example, a text box 122 is typically used to allow a user to enter alphanumeric data (text, numbers) and other keyboard characters. A slider 124 is a graphical element that is typically used to allow a user to enter a number within a range of numbers by sliding or rotating a movable portion 124x of the graphical element. Radio buttons 126 allow any one item among a group of items to be selected. A checkbox 128 allows a user to select the item or not by simply clicking on it. A drop-down menu 130 (referred to herein also as a "listbox") presents a list of items from which to select. The entire list can be displayed, or the list can be selectively displayed, e.g., when a button 130a is clicked. Buttons such as OK and CANCEL may be provided, for example, to allow the user accept the input or cancel the session. The term "input controls", "data input controls", or simply "controls" will be understood to refer to any user interface element that a user can be presented with to prompt for and/or receive input data, whether the input is a mouse click, a sliding action, keyboard data entry, and so on. In embodiments the input controls are active (i.e., input data can be received) for the current session dialog. It may be desirable that the input controls for previous session dialogs be read-only in order to prevent overwriting the historical information contained in the previous sessions.

Figure 2A:
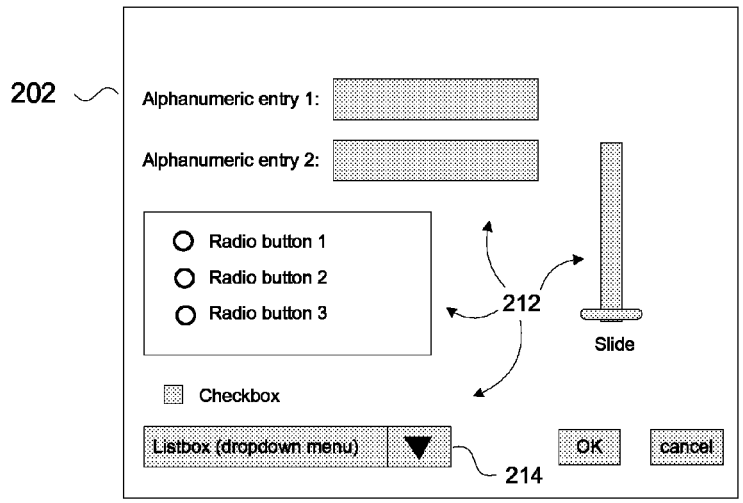
FIGS. 2A-2E depict storing default and user input data to create a historical database in accordance with the present invention.

In embodiments, data that is input for a user interface or otherwise associated with the user interface can be stored in a suitable data store; e.g., a database. FIGS. 2A-2E depict an illustrative example. FIG. 2A shows an example of a user interface 202 that can be displayed to a user on a suitable display device for inputting data. The user interface comprises various input controls 212; e.g., text boxes, radio buttons, slider and so on.

Figure 2B:
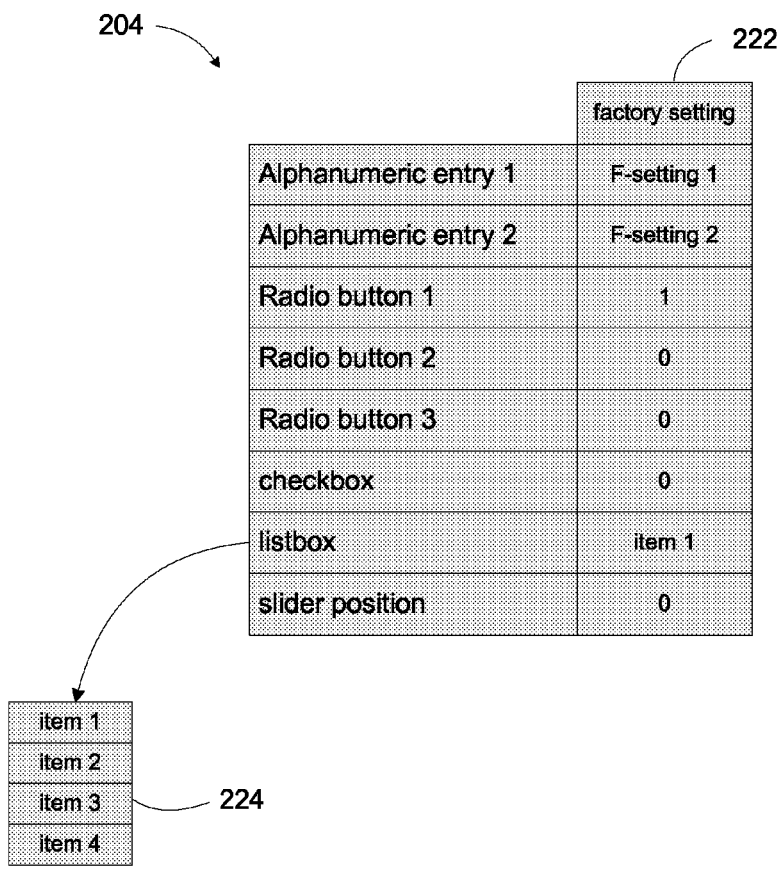

In an embodiment, a data table 204 such as shown in FIG. 2B may store data corresponding to various data states of the input controls 212. A supporting data table 224 represents the list of possible items for the drop-down menu control 214. For example, during a current session dialog, if the user activates the drop-down menu 214, then the list of items displayed can be obtained from the supporting data table 224. In embodiments, the supporting data table 224 may not be used when displaying the user interface for a previous session dialog since the corresponding drop-down menu 214 need only display the value that was selected (if any) during that session.

The term "data state" as used herein will be understood to refer to the data values associated with the input controls in a user interface. Thus, for example, suppose the input controls 212 have an associated factory setting. The data table 204 may include state data 222 that represents the values of the factory settings for the input controls 212 in the user interface 202. The state data 222 represents the "data state" of the input controls 212 for the factory settings.

Figure 2C:
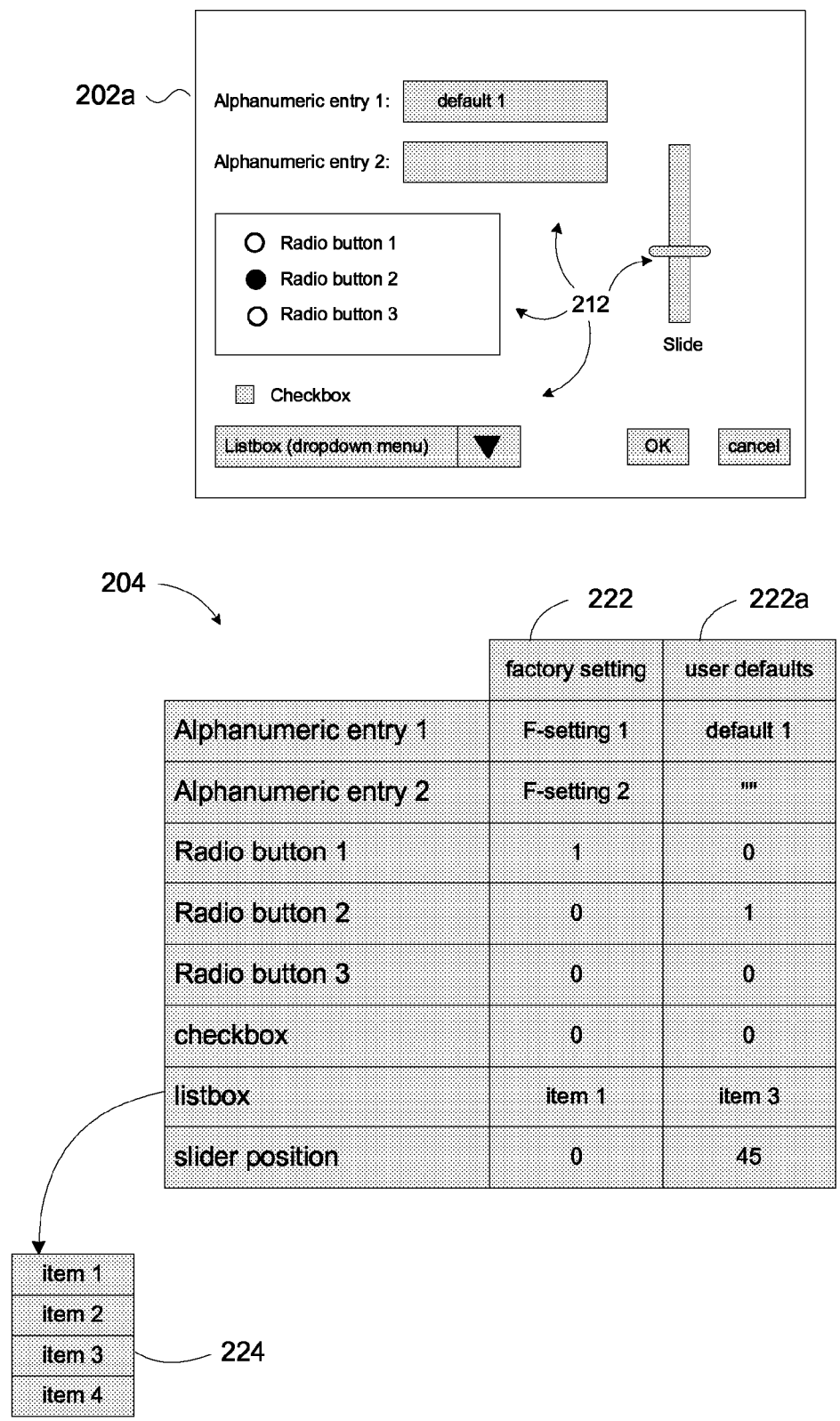

FIG. 2C represents a display of the user interface 202a after the user has entered some default values into the user interface. The figure further includes the corresponding state data 222a in data table 204 that comprise the data state of the user interface 202a. For example, these default values can be established or otherwise determined when the software is installed.

Figure 2D:
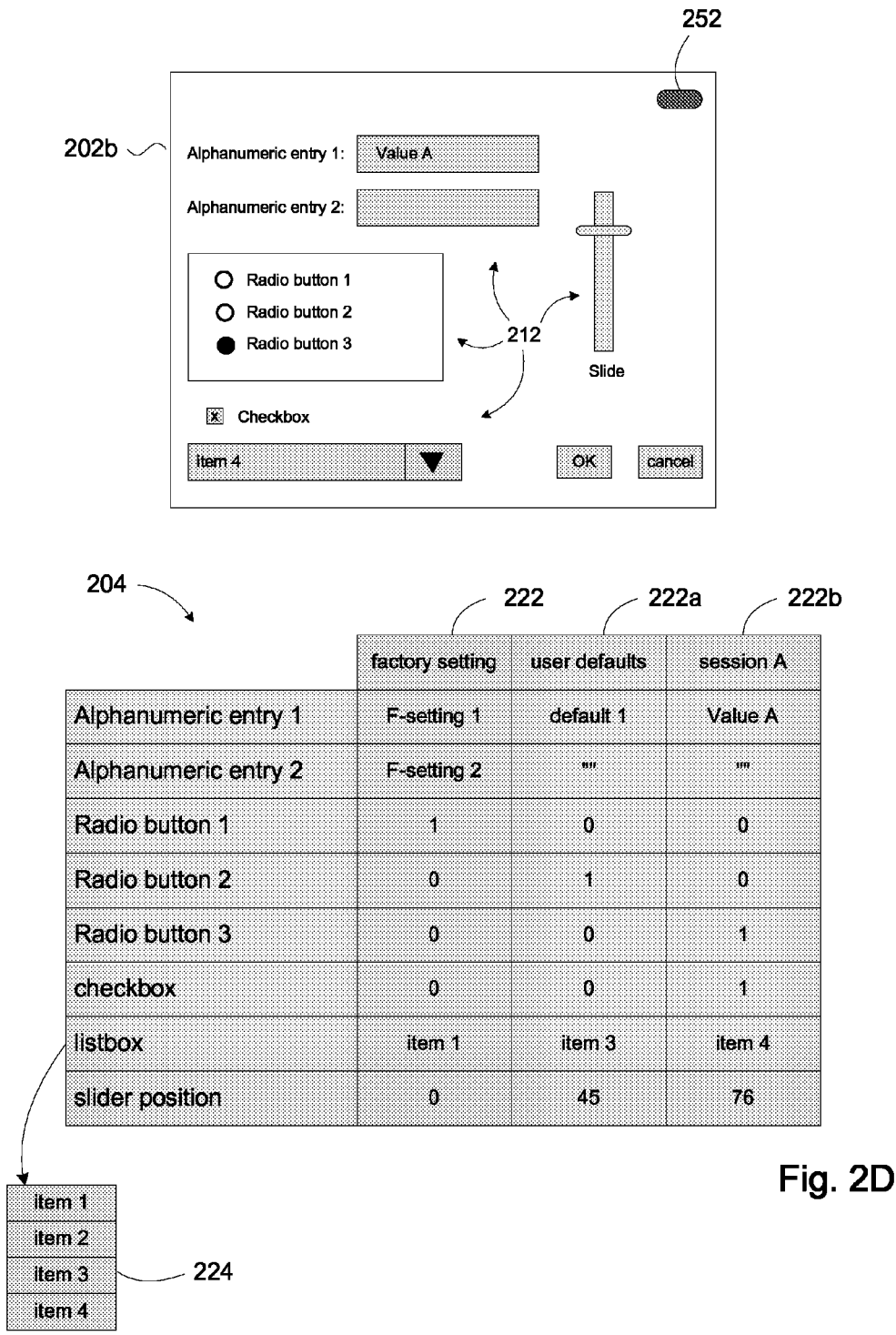

FIG. 2D represents a display of the user interface 202b during a session with the user. The data that corresponds to the data state of the user interface 202b can be stored in the data table 204 as state data 222b. In embodiments, an identifier can be associated with each session in order to facilitate the identification of multiple previously stored sessions. For example, the factory settings can be regarded as a "factory setting session" to inform the user that the corresponding data state of the input controls 212 comprises factory setting data. Accordingly, the state data 222 can be identified as "factory settings." Similarly, the setting up of user default values can be considered as another session, and the corresponding state data 222a can be designated as the "user defaults" session. While it may be desirable that the input controls for previous session dialogs of a user interface be read-only, it may also be desirable that the input controls for the "user defaults" session be read/writable. This would allow the user to change their default settings as needed.

Identifiers for session dialogs with the user can be assigned using any suitable naming format. In embodiments, each session dialog for which a snapshot of the data state of the user interface is saved can be identified by the time (date, hour, minute) at which the snapshot was taken. The naming format can be some generic text, for example, "previous session ###", where ### is an integer that begins with 001 and is incremented with each new saved data state. In embodiments, the user can be prompted to provide an identifier.

Figure 2E:
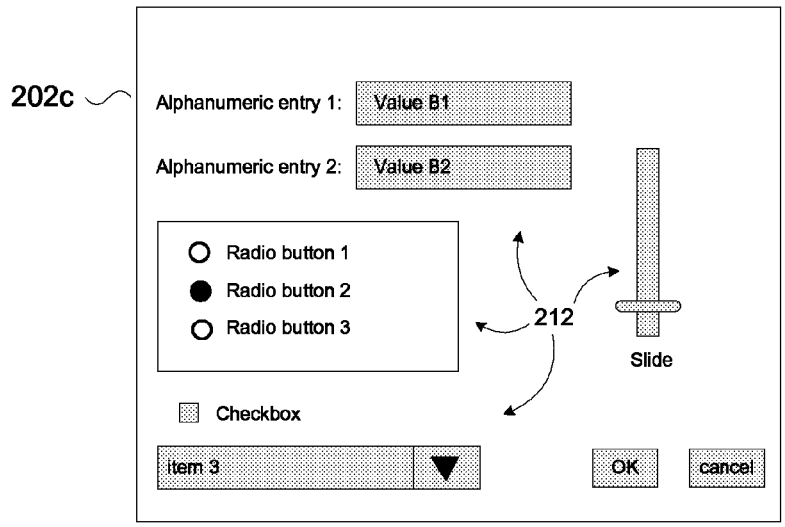

FIG. 2E represents a display of the user interface 202c during a subsequent session dialog with the user. The data that corresponds to the data state of the user interface 202c can be stored in the data table 204 as state data 222c.

Figure 3:
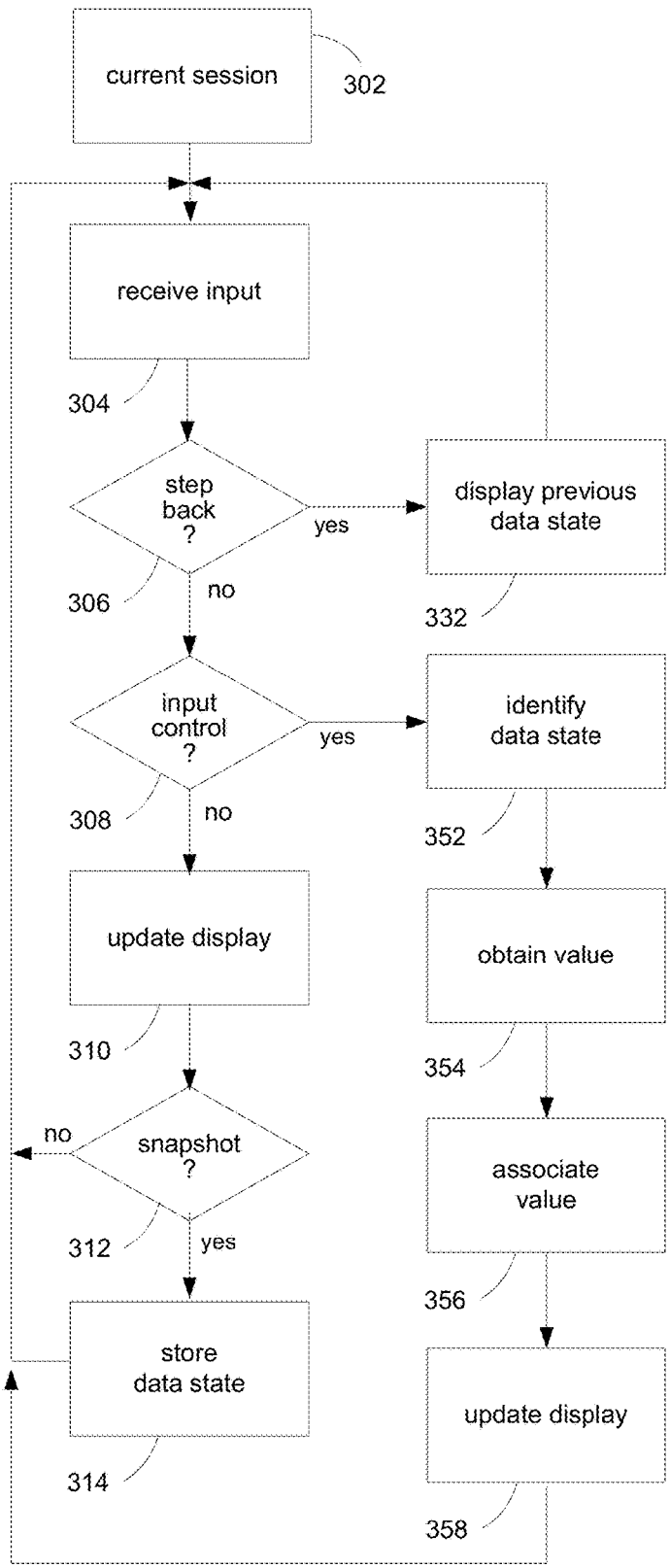
FIG. 3 illustrates a flow for receiving input in a user interface in accordance with the present invention.

FIG. 3 represents a high level flow of actions that can be performed by a suitably programmed computing device to provide a user interface in accordance with the present invention. In a step 302, a user interface can be displayed on a display device, and a current session dialog with the user interface can begin. This may include creating a new column of data in the data table 204. In a step 304, user input can be received from a suitable input device. If in step 306 it is determined that the user input represents an action to "step back" to a previous data state, then a representation of the data state of the user interface at the time of that previous state is displayed (step 332). This aspect of the present invention is discussed in more detail below. If in step 308 it is determined that the user input represents the selection of an input control, then steps are taken to process such user input (steps 352-58). This aspect of the present invention is discussed in more detail below. If the user input represents input data (e.g., entry of text for a text box, a mouse click on a radio button, etc.), then in a step 310 the user input is received and the display of the user interface is updated to reflect receipt of the input data; e.g., text is displayed in the at text box, a radio button is highlighted, the position of a slider lever is adjusted and so on. If in a step 312 it is determined that a snapshot of the data state of the user interface is called for, then the data state will be stored (step 314). This aspect of the present invention is discussed in more detail below. Processing then continues in step 304 to receive the next user input.

Figure 4A:
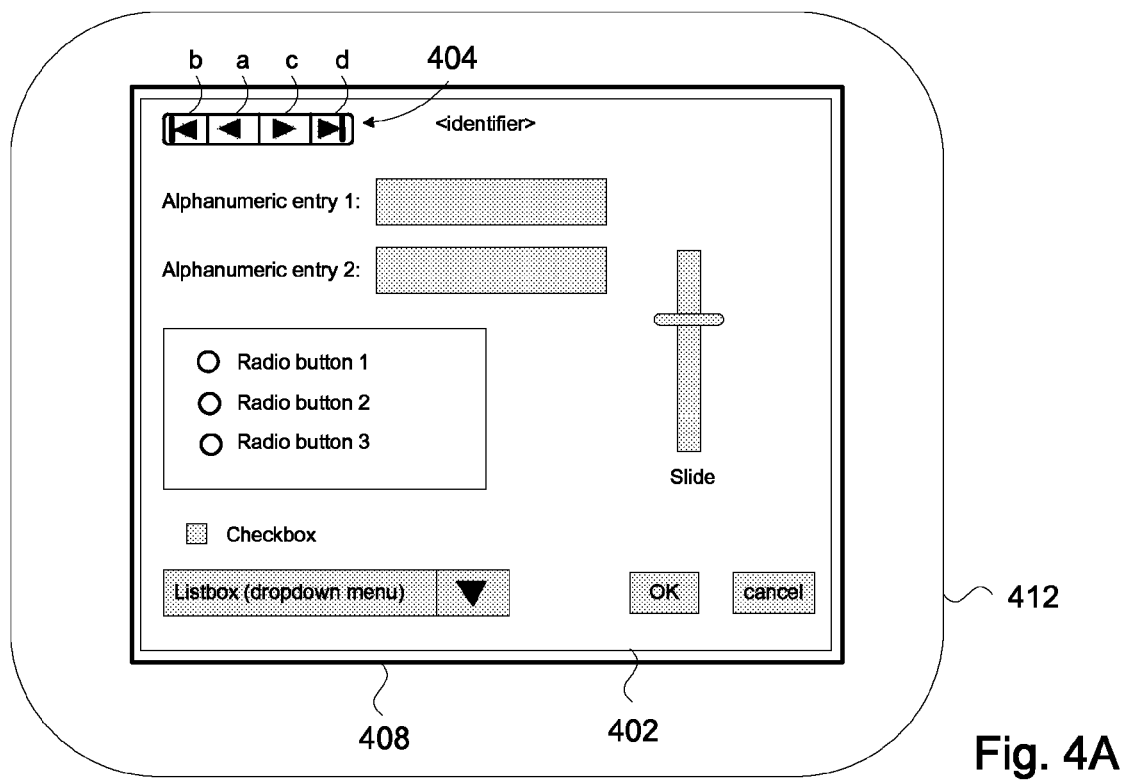
FIGS. 4A and 4B represent illustrative embodiments for accessing and displaying current and previous session dialogs.

Referring back to step 306 where a determination is made whether the user input represents a "step back" action, in embodiments a playback control can be provided to allow the user to input a "step back" action. FIG. 4A illustrates a user interface 402 displayed in a display area 408 on a display device 412. A playback control 404 can be displayed in the display area 408. In embodiments, the playback control 404 can be displayed in the user interface 402. Buttons a-d comprising the playback control 404 can be selected (e.g., mouse over the button and click) by the user to display a previous session of the user interface 402.

In embodiments, the various session dialogs of the user interface 402 can be displayed in the area 408. For example, FIG. 4A shows the current session dialog of the user interface 402. If the user clicks on the button "a" then the representation of the current session of the user interface 402 in display area 408 can be replaced with a representation of a previous data state of the user interface. The identifier can be updated to display a title associated with the previous data state of the user interface 402. Successive clicks of the "a" button in the playback control 404 can display successively earlier data states of the user interface 402. Clicking on the button "b" can display the earliest data state of the user interface 402; e.g., the "factory settings" data state. Clicking on the button "c" can display a data state of the user interface 402 going forward in time. Clicking on the button "d" can display the current data state of the user interface 402, namely the current session dialog of the user interface.

Figure 4B:
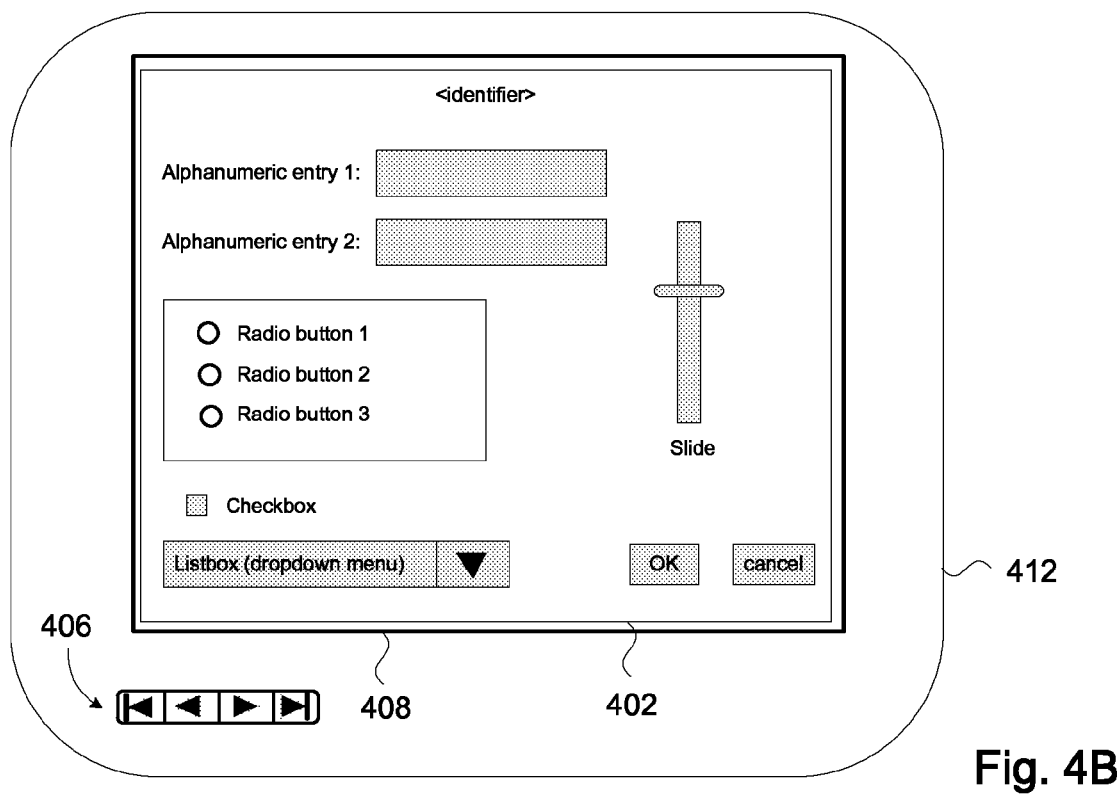

FIG. 4B shows an alternative placement of a playback control 406. In an embodiment, the playback control 406 can be displayed elsewhere on the display device 412, outside of the display area 408. In embodiments, other controls can be used. For example, a drop down menu can be provided to display a list of available previous data states. A slider control can be used. A roller on a mouse input device can be used to provide user input to display previous data states of a user interface.

Figure 5:
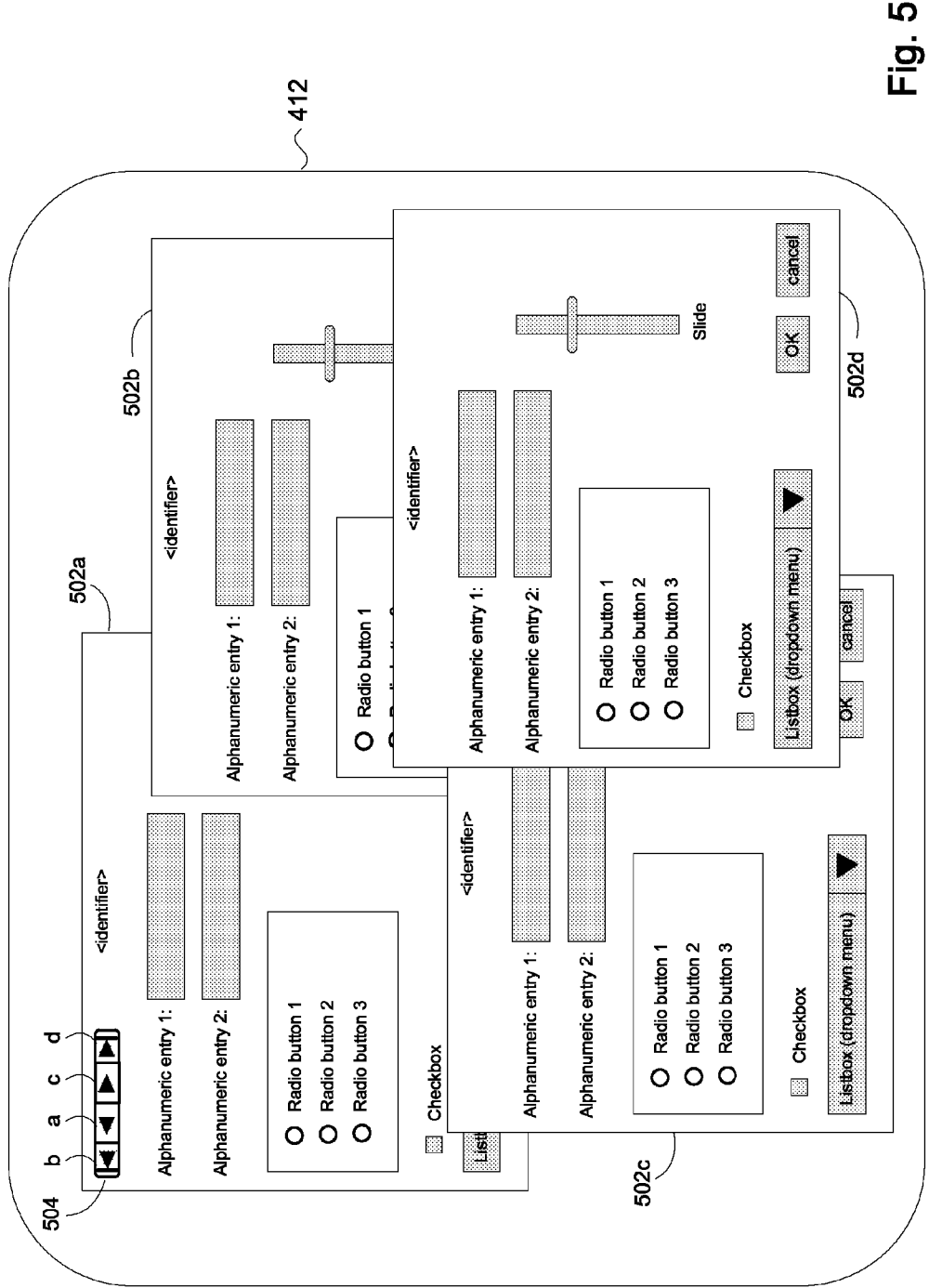
FIG. 5 shows an embodiment of session dialogs displayed in multiple windows.

FIG. 5 shows an embodiment in which each representation of a previous data state of the user interface can be displayed in its own window, 502a-502d. The user can display another previous data state of the user interface by clicking a button "a" on a playback control 504. Presenting multiple windows on the display device 412 may require more screen area, as compared to the single display area approach of FIG. 4A. The decision whether to display in accordance with FIG. 4A or FIG. 5 is based considerations not relevant to the present invention, and thus needs no further discussion.

Figure 7:
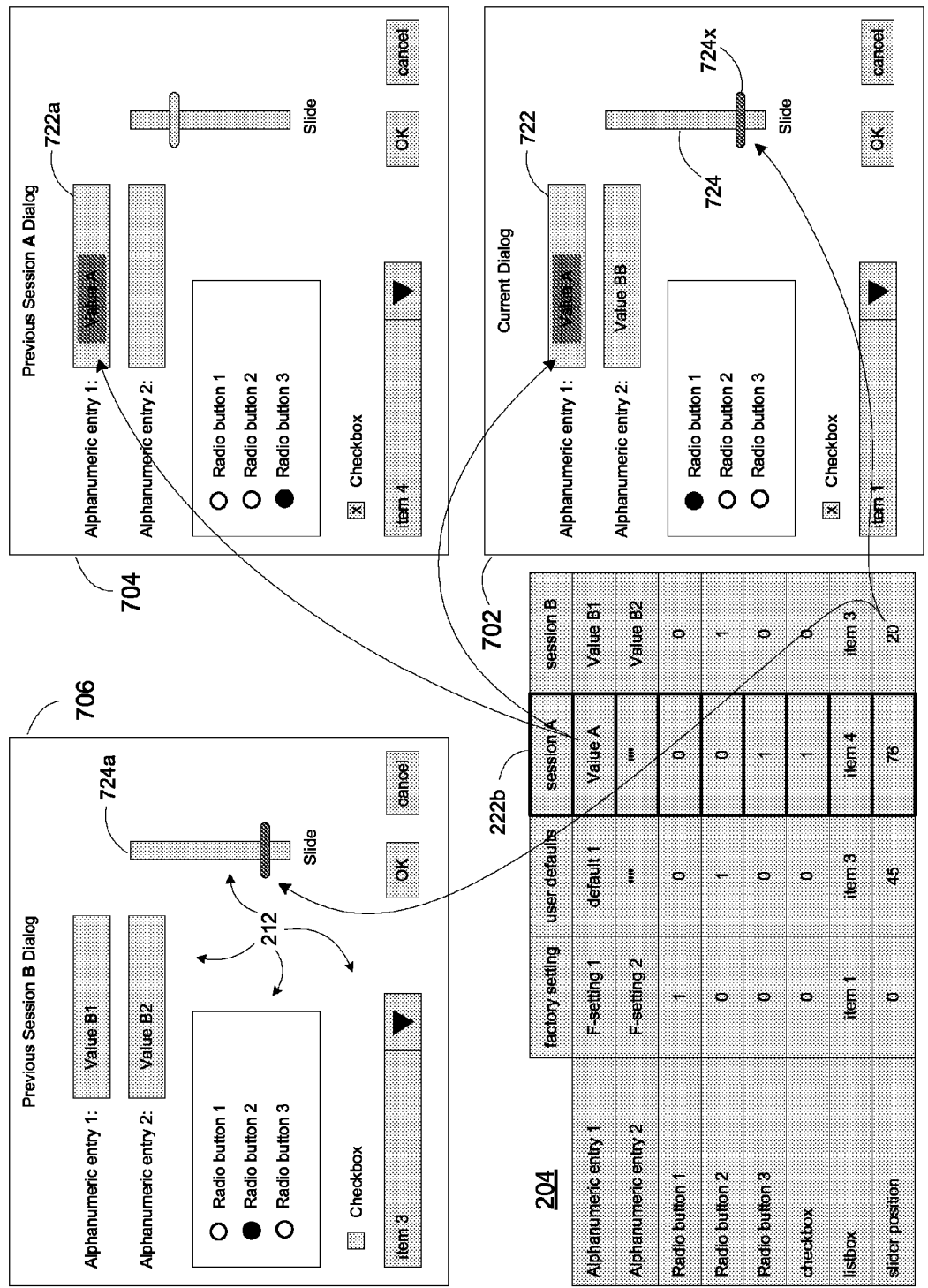
FIG. 7 illustrates populating a current session dialog of a user interface in accordance with the present invention.

Returning to FIG. 3, step 332 shows displaying the user interface from a previous data state in response to receiving a "step back" input from the user. In an embodiment, displaying a representation of a previous data state of the user interface includes accessing the state data (e.g., state data 222c in data table 204, FIG. 2E) that corresponds to the previous data state of interest. The user interface can then be displayed by displaying images of the input controls based on their respective state data. Referring to FIG. 7 for a moment, see for example the data state of the user interface 706 identified as "previous session B dialog". The data table 204 shows the state data of the input controls 212 for this data state of the user interface 706. In the user interface 706, the input controls 212 are displayed based on their respective corresponding data. For example, the image for the text box control for "alphanumeric entry 1:" includes a graphic of a box and the text "Value B1" in the box. The image for the slider control includes displaying an image of the slider lever at a position that corresponds to the value associated with that input control, in this case a value of 20. And so it is for each input control that has a corresponding data value; it is displayed by an image that is representative of its associated data value.

In embodiments, the "factory setting" session and the "user defaults" session can be viewed as previous session dialogs, from which default values can be obtained. As explained in FIG. 4A, the user can "step back" all the way to these settings to obtain default values for a current session dialog.

Returning to FIG. 3, steps 312 and 314 relate to storing a snapshot of a current data state of the user interface. For example, in FIG. 2D, a snapshot of the data state of the input controls 212 in the user interface 202b can be taken, meaning that the data that has been entered so far can be stored in the data table 204. In embodiments, the data state of a user interface can be stored to the data table 204 on a periodic basis, for example every 10 minutes. In embodiments, a snapshot of the data state of a user interface can be made upon the occurrence of an event. For example, the event can be triggered by the user clicking the OK button in the user interface 202b. In embodiments, a "snapshot" button 252 (FIG. 2D) can be provided that triggers the snapshot-saving event when a user clicks it. Accordingly, in step 314, when a data state of the user interface (e.g., 202b) is stored, a new entry (new state data) is made in the data table 204. For example, data entered for each input control 212 in the user interface 202b can be stored as state data 222b in data table 204.

Figure 6:
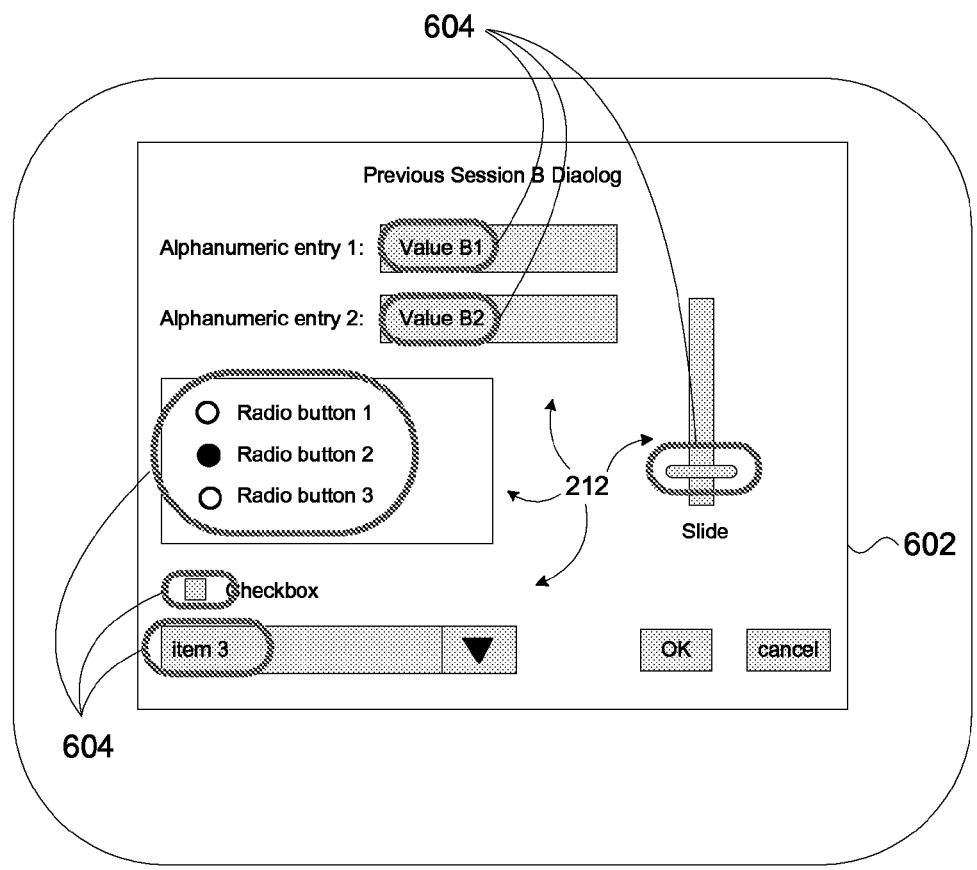
FIG. 6 shows an embodiment illustrating selection of an input control.

The discussion will now turn to FIGS. 6 and 7 in connection with steps 308 and 352-358 of FIG. 3, relating to determining whether the user input received in step 304 represents selection of an input control and if so, the handling of such input. In embodiments of the present invention, the user can select an input control from a previous data state of user input. Referring to FIG. 6, a representation of a previous data state of a user interface 602 is shown, where values had been previously entered for input controls 212; e.g., "Value B1" and "Value B2" for the two input boxes, radio button 2 has been pressed, and so on. In an embodiment, selection controls 604 can be displayed in the representation of the previous data state of the user interface 602. Any suitable computer graphic can be used indicate that an input control can be selected. For example, FIG. 6 shows the selection controls 604 comprise circular elements that encircle selectable input controls. Selection of an input control can involve the user simply mousing over its corresponding selection control 604 and double-clicking.

In embodiments, when a user selects an input control in a user interface (e.g., by clicking on its corresponding selection control graphic 604), the corresponding data state of the user interface containing the selected input control is noted (step 352). The state data (e.g., 212-212c) in the data table 204 that corresponds to the data state of the user interface is referenced. The value(s) associated with the selected input control is then accessed from the referenced state data (step 354). The accessed value is then associated with the input control in the current data state of the user interface (step 356). In an embodiment, for example, step 356 may involve simply storing the accessed value in a working memory area that is being used for the current session dialog. In a step 358, an image of the selected input control currently being displayed in the current session dialog of the user interface may be updated to represent the accessed value. In an embodiment, for example, the image can be a copy of the image of the input control as displayed in the previous data state of the user interface from which the accessed value was selected. The image can be enhanced in some way (e.g., a flashing graphic) to indicate that the value for that input control was obtained from a previous data state, rather than having been input by the user during the current session dialog.

FIG. 7 illustrates an example of the foregoing described sequence. A current session dialog for a user interface 702 is shown. The figure indicated that the user has entered the value "Value BB" in the current session dialog for input control "alphanumeric entry 2". Similarly, the figure indicates the following inputs provided in the current session dialog: radio button 1 has been selected; the checkbox has been checked; and "item 1" has been selected.

Two previous session dialogs "A" and "B" are also shown. The data table 204 shows the state data for session "A" and the state data for session "B". Suppose the user is considering input for the input control 722 in the current session dialog 702. Suppose further that the user has selected a corresponding input control 722a from a previous session dialog 704. In accordance with step 352 of FIG. 3, the input control 722a is determined to be associated with a data state of the user interface that is identified as session "A". In accordance with step 354, the data table 204 is accessed to reference the state data 222b that corresponds to the data state of session "A"; thus, the value "Value A" is obtained from the referenced state data. The value "Value A" can be associated with or otherwise treated as being the input value for the corresponding input control 722 in the current session dialog 702 (step 356). The input controls in the current session dialog 702 can be updated (step 358) to reflect the obtained value. For example, the input control 722 in the current session dialog 702 can be updated to show the value "Value A". Likewise, the input control 724 in the current session dialog 702 can be updated to reflect the value 20; e.g., by proper location of the slider element 724x. In embodiments, the data for input controls that receive their data from previous session dialogs can be further modified by the user. For example, the user can input a new value into input control 722 if desired. Similarly, slider element 724x can be readjusted to change its value.

Figure 8:
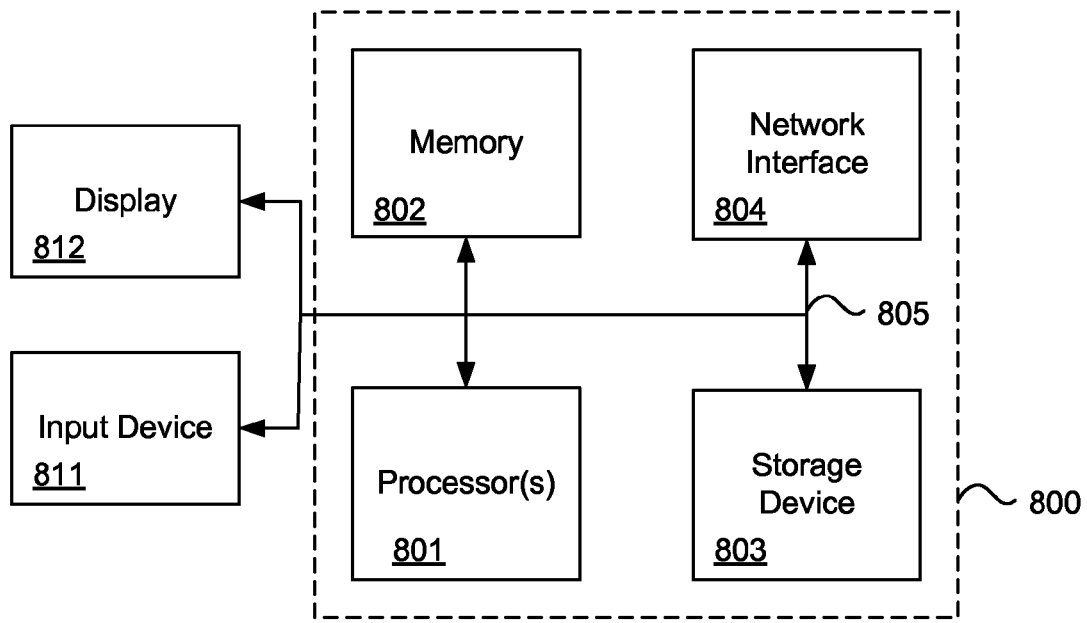
FIG. 8 shows a computer system configured in accordance with the present invention.

Referring to FIG. 8, in embodiments, a computer system 800 can be configured to operate in accordance with aspects of the present invention. A data processor subsystem 801 may comprise one or more data processing units. A memory subsystem 802 may comprise random access memory (usually volatile memory such as DRAM) and non-volatile memory such as FLASH memory, ROM, and so on. A storage subsystem 803 may comprise one or more mass storage devices such as hard disk drives and the like. The storage subsystem 803 can be configured to store the data table 204. In embodiments, the storage subsystem 803 may include remote storage systems; e.g., for data mirroring, remote backup and such. A network interface subsystem 804 can provide users with access to the Internet, for example over a telecommunication network. A system of buses 805 can interconnect the foregoing subsystems, providing control lines, data lines, and/or voltage supply lines to/from the various subsystems. The computer system 800 may include a suitable display(s) 812 and input devices 811 such as a keyboard and a mouse input device.

The memory subsystem 802 may have stored in the non-volatile memory computer executable programs, which when executed can cause the data processing subsystem 801 to display the various session dialogs in accordance with the present invention. For example, the memory subsystem 802 may include computer executable programs that can cause the data processing subsystem 801 to performs steps set forth in FIG. 3 and display representations of a user interface such as illustrated in FIGS. 4A-4B and 5-7 on the display 812, including receiving input from input devices 811.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method for a user interface comprising operating a data processor to perform steps of:
    displaying a first representation that includes a current data state of a plurality of input controls for a user interface;
    receiving a navigation input to display a second representation that includes a previous data state of the input controls;
    displaying the second representation that includes the previous data state of the input controls;
    receiving a selection input that indicates selection of a previous input control selected from the second representation that includes the previous data state of the input controls; and
    redisplaying the first representation including replacing a current input control in the first representation that includes the current data state of the input controls with the selected previous input control, wherein data corresponding to a data state of the selected previous input control constitutes data for a data state of the current input control in the first representation that includes the current data state of the input controls.

2. The method of claim 1 further comprising operating the data processor to perform a step of displaying a third representation of an additional previous data state of the input controls.

3. The method of claim 1 wherein the first representation is displayed in a first window, wherein the second representation is displayed in a second window different from the first window.

4. The method of claim 1 wherein the first representation is displayed in a window, wherein the second representation is subsequently displayed in the window.

5. The method of claim 1 further comprising operating the data processor to perform a step of receiving user input, wherein the second representation is displayed in response to the user input.

6. The method of claim 1 further comprising operating the data processor to perform a step of displaying a third representation of a data state of the input controls comprising a plurality of default values.

7. The method of claim 6 wherein the default values are factory-provided or user-provided.

8. The method of claim 1 further comprising operating the data processor to perform steps of:
    displaying a third representation of another previous data state of the input controls;
    receiving another input indicative of a second input control selected from the third representation of the input controls; and
    associating data corresponding to said another previous data state of the second input control as input data for the current data state of the second input control.

9. The method of claim 8 further comprising operating the data processor to perform a step of redisplaying the first representation including displaying an image of the second input control based on an image of the second input control in the third representation.

10. A non-transitory computer readable medium having stored thereon a computer executable program, the computer executable program configured to cause a data processor to:
- display a first representation that includes a current data state of a plurality of input controls for a user interface;
- receive a navigation input to display a second representation that includes a previous data state of the input controls;
- display a second representation that includes the previous data state of the input controls;
- receive a selection input that indicates selection of a previous input control selected from the second representation that includes the previous data state of the input controls;
- redisplay the first representation including replacing a current input control in the first representation that includes the current data state of the input controls with the selected previous input control, wherein data corresponding to a data state of the selected previous input control constitutes data for a data state of the current input control in the first representation that includes the current data state of the input controls.

11. The computer readable medium of claim 10 wherein the first representation is displayed in a first window, wherein the second representation is displayed in a second window different from the first window.

12. The computer readable medium of claim 10 wherein the first representation is displayed in a window, wherein the second representation is subsequently displayed in the window.

13. The computer readable medium of claim 10 further comprising computer executable program configured to cause a data processor to operate the data processor to receive user input, wherein the second representation is displayed in response to the user input.

14. The computer readable medium of claim 10 further comprising computer executable program configured to cause a data processor to display a third representation of a data state of the input controls comprising a plurality of default values.

15. The computer readable medium of claim 10 further comprising computer executable program configured to cause a data processor to:
- display a third representation of another previous data state of the input controls;
- receive another input indicative of a second input control selected from the third representation of the input controls; and
- associate data corresponding to said another previous data state of the second input control as input data for the current data state of the second input control.

16. The computer readable medium of claim 15 further comprising computer executable program configured to cause a data processor to redisplay the first representation including displaying an image of the second input control based on an image of the second input control in the third representation.

17. A computer system having stored therein computer executable program code, which, when executed by a data processor, causes the data processor to:
- display on a display device a first representation that includes a current data state of a plurality of input controls for a user interface;
- receive a navigation input from an input device to display a second representation that includes a previous data state of the input controls;
- display on the display device a second representation that includes the previous data state of the input controls;
- receive a selection input from the input device that indicates selection of a previous input control selected from the second representation that includes previous data state of the input controls;
- redisplay on the display device the first representation including replacing a current input control in the first representation that includes the current data state of the input controls with the selected previous input control, wherein data corresponding to a data state of the selected previous input control constitutes data for a data state of the current input control in the first representation that includes the current data state of the input controls.

18. The computer system of claim 17 wherein the first representation is displayed in a first window, wherein the second representation is displayed in a second window different from the first window.

19. The computer system of claim 17 wherein the first representation is displayed in a window, wherein the second representation is subsequently displayed in the window.

20. The computer system of claim 17 wherein the computer executable program code, which, when executed by a data processor, further causes the data processor to:
- display on the display device a third representation of another previous data state of the input controls;
- receive from the input device another input indicative of a second input control selected from the third representation of the input controls; and
- associate data corresponding to said another previous data state of the second input control as input data for the current data state of the second input control.

* * * * *